United States Patent
Itoh et al.

(10) Patent No.: US 11,221,653 B2
(45) Date of Patent: *Jan. 11, 2022

(54) APPARATUS AND METHODS FOR DETERMINING POSITIONAL STATE BASED ON MAGNETIC FLUX

(71) Applicant: LENOVO (Singapore) PTE. LTD., New Tech Park (SG)

(72) Inventors: Masato Itoh, Yokohama (JP); Tabito Miyamoto, Yokohama (JP); Masaaki Bandoh, Yokohama (JP); Toshikazu Horino, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,539

(22) Filed: Jun. 5, 2020

(65) Prior Publication Data
US 2020/0387197 A1 Dec. 10, 2020

(51) Int. Cl.
*G06F 1/16* (2006.01)
(52) U.S. Cl.
CPC .......... *G06F 1/1656* (2013.01); *G06F 1/1677* (2013.01); *G06F 1/1679* (2013.01); *G06F 1/1684* (2013.01)
(58) Field of Classification Search
CPC .... G06F 1/1656; G06F 1/1677; G06F 1/1679; G06F 1/1684
See application file for complete search history.

(56) References Cited

U.S. PATENT DOCUMENTS

| | | | | |
|---|---|---|---|---|
| 9,035,872 B2* | 5/2015 | Brown | ...................... | G01B 7/30 345/156 |
| 10,496,129 B2* | 12/2019 | Miyamoto | ............ | G06F 1/1694 |
| 2006/0045495 A1* | 3/2006 | Prabhune | ................ | G06F 1/169 386/359 |
| 2006/0135226 A1* | 6/2006 | Won | ...................... | G06F 1/1616 455/575.3 |
| 2008/0238816 A1* | 10/2008 | Matsushita | ........... | G06F 1/1643 345/30 |
| 2009/0051174 A1* | 2/2009 | Ho | ........................ | G06F 1/1677 292/251.5 |
| 2009/0284225 A1* | 11/2009 | Nakanuma | .......... | H01M 10/441 320/134 |

(Continued)

FOREIGN PATENT DOCUMENTS

| | | |
|---|---|---|
| JP | 2006065696 A | 3/2006 |
| JP | 2008250835 A | 10/2008 |

(Continued)

*Primary Examiner* — Adrian S Wilson
(74) *Attorney, Agent, or Firm* — Kunzler Bean & Adamson

(57) ABSTRACT

Apparatus and methods that determine the positional state of a lid body relative to a chassis body based on a detected amount of magnetic flux are disclosed. One apparatus includes a lid body including a first magnet and a magnetic sensor and a chassis body including a second magnet. The magnetic sensor is configured to detect an amount of magnetic flux from the first magnet and the second magnet is positioned on the chassis body to influence the amount of magnetic flux detected by the magnetic sensor based on the relative positions of the lid body and the chassis body.

20 Claims, 6 Drawing Sheets

(56) References Cited

U.S. PATENT DOCUMENTS

| | | | | |
|---|---|---|---|---|
| 2010/0298032 A1* | 11/2010 | Lee | ............... | G06F 1/1677 |
| | | | | 455/566 |
| 2011/0285385 A1* | 11/2011 | Nakamura | ............ | G06F 1/1677 |
| | | | | 324/207.11 |
| 2012/0154288 A1* | 6/2012 | Walker | ................. | G06F 1/1681 |
| | | | | 345/169 |
| 2013/0205142 A1* | 8/2013 | Jung | ..................... | G06F 1/1677 |
| | | | | 713/300 |
| 2014/0028865 A1* | 1/2014 | Ohtaka | ................ | G06F 1/1686 |
| | | | | 348/211.4 |
| 2020/0233046 A1* | 7/2020 | Ding | ....................... | H02J 7/025 |

FOREIGN PATENT DOCUMENTS

| | | |
|---|---|---|
| JP | 2015119470 A | 6/2015 |
| JP | 2016076045 A | 5/2016 |
| JP | 2017228109 A | 12/2017 |

\* cited by examiner

APPARATUS AND METHODS FOR DETERMINING POSITIONAL STATE BASED ON MAGNETIC FLUX

REFERENCE TO RELATED APPLICATION

This application claims priority to Japanese Patent Application No. JP2019-105002, filed on Jun. 5, 2019, the contents of which are incorporated herein by reference, in their entirety.

FIELD

The subject matter disclosed herein relates to computing systems and devices and, more particularly, relates to keyboard baseplates including a concave structure for housing a logic substrate.

BACKGROUND

Some conventional computing systems and/or computing devices (e.g., a laptop computer) include a lid having a display and a chassis connected to the lid. The lid can open or close with respect to the chassis and a magnetic sensor can detect when the lid opens and closes.

Various recent laptop personal computers can be used as a laptop personal computer (PC) and as, for example, a tablet by rotating the lid or separating the lid from the chassis and placing the lid back-to-back with the chassis.

In using such a laptop PC as a tablet, however, the magnetic sensor is typically positioned far from the magnet as the positional relationship between the lid and the chassis is reversed from that when the laptop PC is used as a laptop PC. This structure can lead to a failure in detecting that the laptop PC is being used as a tablet. When the sensitivity of the magnetic sensor is increased, there is a concern that the magnetic sensor may be turned ON before the lid is fully closed when the laptop PC is being used as a laptop PC. This may also lead to the situation of the screen being inadvertently being turned OFF by a user.

BRIEF SUMMARY

Various embodiments provide apparatuses and methods that determine the positional state of a lid body relative to a chassis body based on a detected amount of magnetic flux are disclosed. One embodiment of an apparatus includes a lid body including a first magnet and a magnetic sensor and a chassis body including a second magnet. The magnetic sensor is configured to detect an amount of magnetic flux from the first magnet and the second magnet is positioned on the chassis body to influence the amount of magnetic flux detected by the magnetic sensor based on the relative positions of the lid body and the chassis body.

Other embodiments provide an apparatus including a sensor and a processor coupled to the sensor. The sensor is configured to detect an amount of magnetic flux from a first magnet positioned at least a predetermined distance from the apparatus and the amount of magnetic flux detected by the sensor is influenced by a position of a second magnet relative to the first magnet. The processor is configured to determine a current positional state of a plurality of positional states of a lid body relative to a chassis body based on the amount of magnetic flux detected by the sensor Various embodiments of a method include detecting, by a magnetic sensor, an amount of magnetic flux from a first magnet positioned at least a predetermined distance from the magnetic sensor in which the amount of magnetic flux detected by the magnetic sensor is influenced by a position of a second magnet relative to the first magnet. The method further includes determining, by the magnetic sensor, a current positional state of a plurality of positional states of a lid body relative to a chassis body based on the amount of magnetic flux detected by the magnetic sensor.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
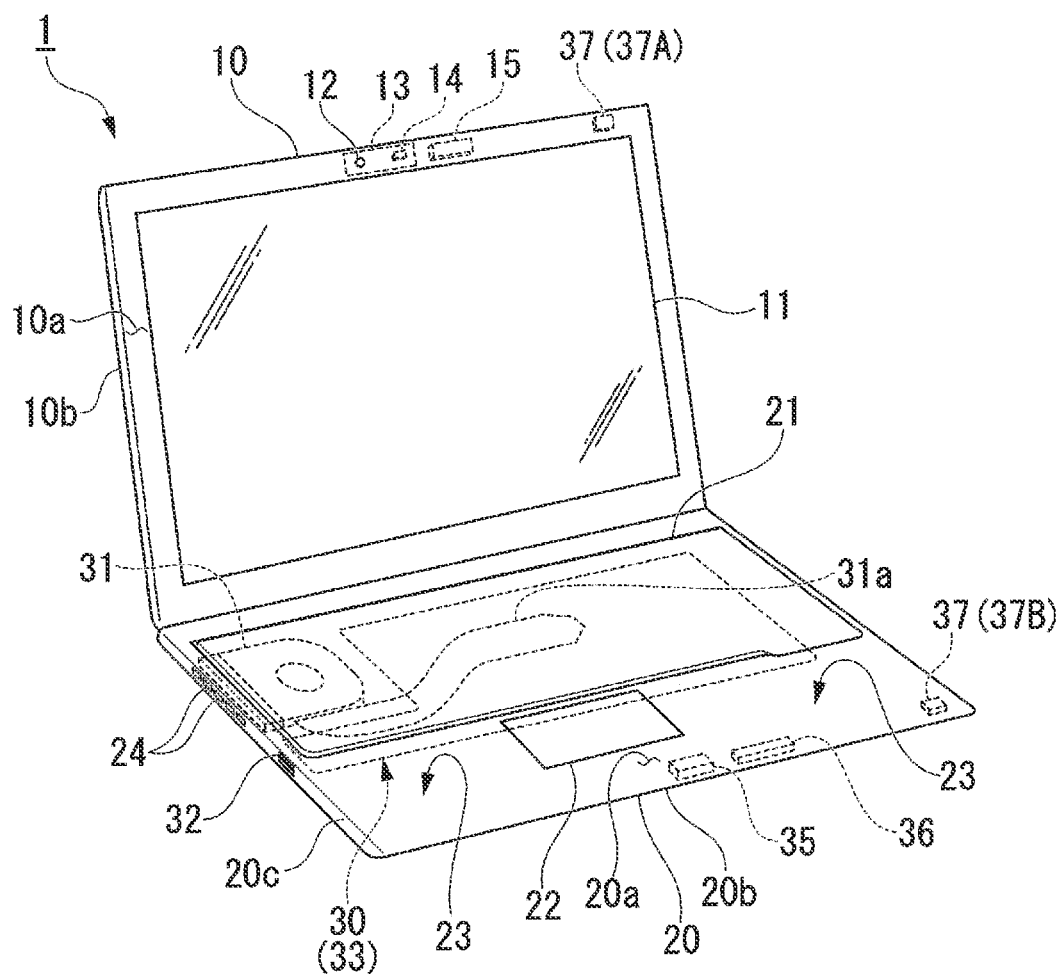
FIG. 1 is a schematic diagram illustrating a perspective view of one embodiment of an electronic apparatus.

As will be appreciated by one skilled in the art, aspects of the embodiments may be embodied as an apparatus and/or a system. Accordingly, embodiments may take the form of an entirely hardware embodiment or an embodiment combining hardware and software aspects that may all generally be referred to herein as a "circuit," "module" or "system."

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present technology has been conceived in view of the issues discussed above in the background section and aims to provide an electronic apparatus that can determine whether the first unit and the second unit are set in a face-to-face state or a back-to-back state. Specifically, to address the these issues, an electronic apparatus according to various embodiments includes a first unit (e.g., a lid body) including a display unit on the front surface, a second unit (e.g., a chassis body) including a first surface over which the first unit can placed with the front surface facing the first surface, and a second surface over which the first unit can be placed with its rear surface facing the second surface, the second surface being disposed on the opposite side from the first surface, a first magnet provided on the second unit, a magnetic sensor provided on the first unit in which the magnetic sensor is disposed spaced apart from the first magnet by a first distance in a first state in which the first unit is placed over the first surface of the second unit, the magnetic sensor being disposed spaced apart from the first magnet by a second distance that is longer than the first distance in a second state in which the first unit is placed over the second surface of the second unit, and a second magnet provided on the first unit in which the second magnet is configured to weaken a magnetic flux to be received by the magnetic sensor in the first state and the second magnet is configured to enhance a magnetic flux to be received by the magnetic sensor in the second state.

In some embodiments, the electronic apparatus further includes a third magnet provided on the second unit in which the third magnet is configured to magnetically attract the second magnet in the first state and the second state. In additional or alternative embodiments, the electronic apparatus further includes a hinge mechanism that connects the first unit and the second unit in a manner that allows the first unit and the second unit to rotate from the first state to the second state. In further additional or alternative embodiments, the electronic apparatus further includes an angle sensor configured to detect the rotation angle between the first unit and the second unit and a control device that controls turning ON/OFF the electronic apparatus based on rotation angle detected by the angle sensor. Accordingly, the various embodiments can determine whether the first unit and the second unit on an electronic apparatus are in a face-to-face state or configuration and/or a back-to-back state or configuration.

Turning now to the figures, FIG. 1 is a perspective view of one embodiment of an electronic apparatus 1. At least in the illustrated embodiment, the electronic apparatus 1 includes a clamshell-shaped personal computer or a laptop personal computer.

In various embodiments, the electronic apparatus 1 includes, among other components, a first unit 10 (e.g., a lid body) and a second unit 20 (e.g., a chassis body). As shown, each of the first unit 10 and the second unit 20 includes a low-profile box shape.

In some embodiments, the first unit 10 includes, among other components, a display unit 11 on its front surface 10a. The display unit 11 includes, for example, a touch panel liquid crystal display (LCD) or an organic electroluminescent (EL) display.

In additional or alternative embodiments, the second unit 20 includes, among other components, a first surface 20a (e.g., a top surface) over which the first unit 10 is to be placed with the front surface 10a facing the first surface 20a. In some embodiments, a keyboard 21 and/or a touch pad 22 are provided on the first surface 20a.

The keyboard 21, in certain embodiments, is disposed on the first surface 20a in a position farther away from a user of the keyboard 21 than the touch pad 22. That is, the touch pad 22 is disposed on the first surface 20a in a position closer to the user than the keyboard 21. In some embodiments, a set of palm rests 23 are disposed on the first surface 20a to the right and left sides of the touch pad 22.

In various embodiments, a motherboard 30, a cooling fan 31, and a battery (not illustrated) are provided inside the second unit 20. On the left side surface 20c of the second unit 20, a discharge opening 24 and a Universal Serial Bus (USB) receptacle 32 are provided.

The motherboard 30 is securely fastened on a plurality of bosses (not illustrated) standing on the bottom portion of the second unit 20, so as to be disposed opposed to, and substantially parallel to, the bottom portion with a space therebetween. Further, the motherboard 30 is disposed on the side of the rear surface of the keyboard 21, occupying substantially half of the area of the second unit 2.

In some embodiments, the cooling fan 31 is disposed at a far-left corner of the second unit 20 with respect to a user of the electronic apparatus 1. The cooling fan 31 is configured to cool the motherboard 30 via a heat pipe 31a and to discharge the air inside the second unit 20 to the outside through the discharge opening 24.

Figure 2:
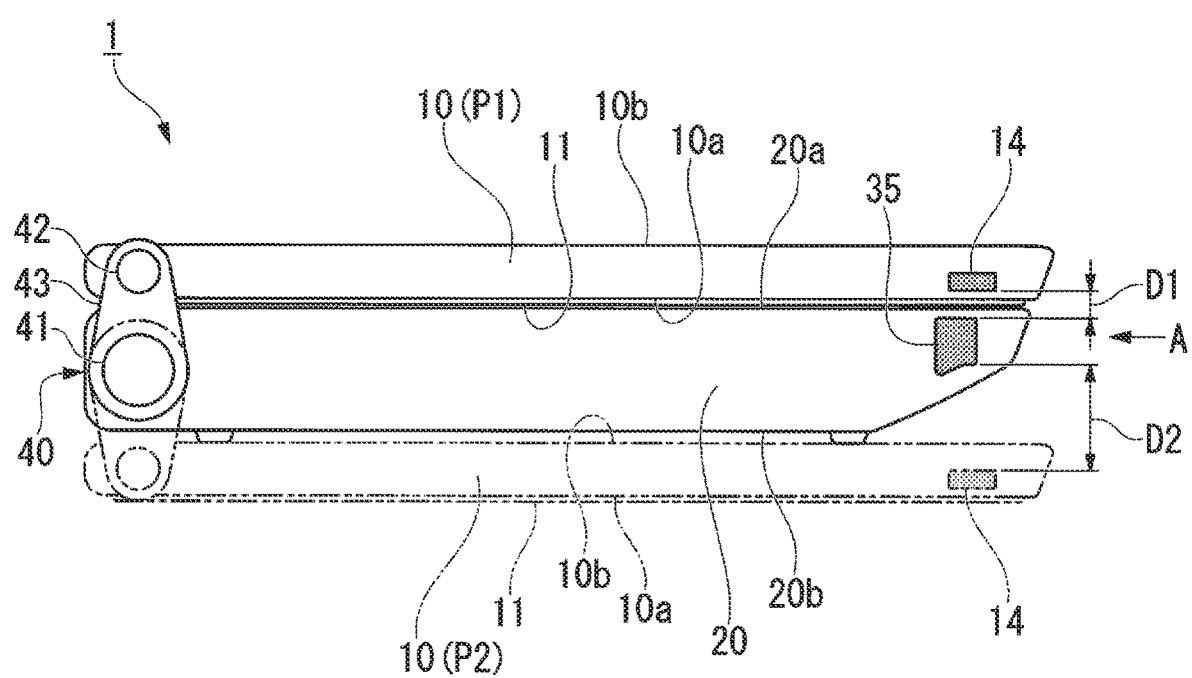
FIG. 2 is a diagram schematically illustrating a side view of a hinge mechanism that couples a first unit (a lid body) and a second unit (a chassis body) in the electronic apparatus of FIG. 1.

Referring to FIG. 2, FIG. 2 is a schematic left side view of one embodiment of a hinge mechanism 40 that connects the first unit 10 and the second unit 20. As illustrated in FIG. 2, the first unit 10 is connected via the hinge mechanism 40 and the hinge mechanism 40 allows/enables the first unit 10 to rotate relative to the second unit 20 by three hundred sixty degrees (360°).

The hinge mechanism 40 in certain embodiments, includes a twin-link mechanism including two connection shafts 41 and 42 and one link member 43. The link member 43 is rotatable relative to the connection shaft 41 provided on the second unit 20 and to the connection shaft 42 provided on the first unit 10, respectively.

A first configuration and/or first state P1 is illustrated with a solid line in FIG. 2. The first state P1 refers to a state in which the first unit 10 is placed over the first surface 20a (e.g., the top surface) of the second unit 20 with the front surface 10a (e.g., the surface with the display unit 11) facing the first surface 20a. That is, the first state P1 is a state in which the first unit 10 and the second unit 20 are set face-to-face with each other. In the first state P1, the first unit 10 forms a cover that covers the display unit 11 and the first surface 20a of the second unit 20.

Additionally or alternatively, a second state P2, illustrated with a long dashed double-short dashed line in FIG. 2, refers to a state in which the first unit 10 is placed over the second surface 20b (the bottom surface) of the second unit 20 with the rear surface 10b (the surface without the display unit 11) facing the second surface 20b (that is, a state in which the first unit 10 and the second unit 20 are set back-to-back). In the second state P2, the display unit 11, disposed on the side of the bottom surface of the second unit 20, is turned over so as to face upward for a touch operation, so that the electronic apparatus 1 can be used as a tablet.

In certain embodiments, a magnetic sensor 14 is provided inside the first unit 10. In various embodiments, the magnetic sensor 14 includes a processor configured to detect the above-described first state P1 and second state P2.

As illustrated in FIG. 1, the magnetic sensor 14 is positioned on the peripheral portion (e.g., the bezel portion) of the display unit 11 on the front surface 10a of the first unit 10 at a position above the display unit 11. The magnetic sensor 14 is configured to detect that the position is closer to a user of the electronic apparatus 1 in the first state P1 (e.g., a state in which the first unit 10 is closed). Further, the magnetic sensor 14 is configured to detect that the position is farther from the user of the electronic apparatus 1 in the second state P2 (e.g., a state in which the first unit 10 is open).

Further, above the display unit 11, a microphone 12 configured to detect sound and/or noise is disposed. The microphone 12 is mounted on a microphone board 13 housed inside the first unit 10. The magnetic sensor 14 in some embodiments is similarly mounted on the microphone board 13. Note that in the case where a camera (not illustrated) is disposed at a position above the display unit 11, the magnetic sensor 14 may be mounted on a camera board of the camera.

In some embodiments, a first magnet 35 is provided inside the second unit 20. As illustrated in FIG. 2, the first magnet 35 is disposed at a position overlapping the magnetic sensor 14 in the first state P1 and the second state P2. In certain embodiments, the first magnet 35 includes a pointed shape (e.g., a shape including a thinner end portion) undercut on its bottom surface with a pointed portion sloped toward the side of the second unit 20 is closer to a user of the electronic apparatus 1 can be effectively utilized (see, e.g., the right side of FIG. 2). Alternatively, the first magnet 35 may include a simple block shape.

The magnetic sensor 14, in various embodiments, is disposed spaced apart from the first magnet 35 by a first distance D1 in the first state P1. Here, the first unit 10 is placed over the first surface 20a of the second unit 20. Further, the magnetic sensor 14 is disposed spaced apart from the first magnet 35 by a second distance D2, which is longer than the first distance D1 in the second state P2. Here, the first unit 10 is placed over the second surface 20b of the second unit 20. In some embodiments, the second distance D2 is twofold longer or more than the first distance D1, among other ratios that are possible and contemplated herein. In certain embodiments, the second distance D2 is threefold longer than the first distance D1.

As illustrated in FIG. 1, a second magnet 15 is provided inside the first unit 10 to assist in detecting the first state P1 and the second state P2 by the magnetic sensor 14. Specifically, the second magnet 15 is disposed adjacent to the magnetic sensor 14 on the peripheral portion (e.g., the bezel portion) of the display unit 11 on the front surface 10a of the first unit 10. The second magnet 15 is secured on the inner wall surface of the chassis of the first unit 10 via, for example, an adhesive agent and/or the like substances.

Figure 3:
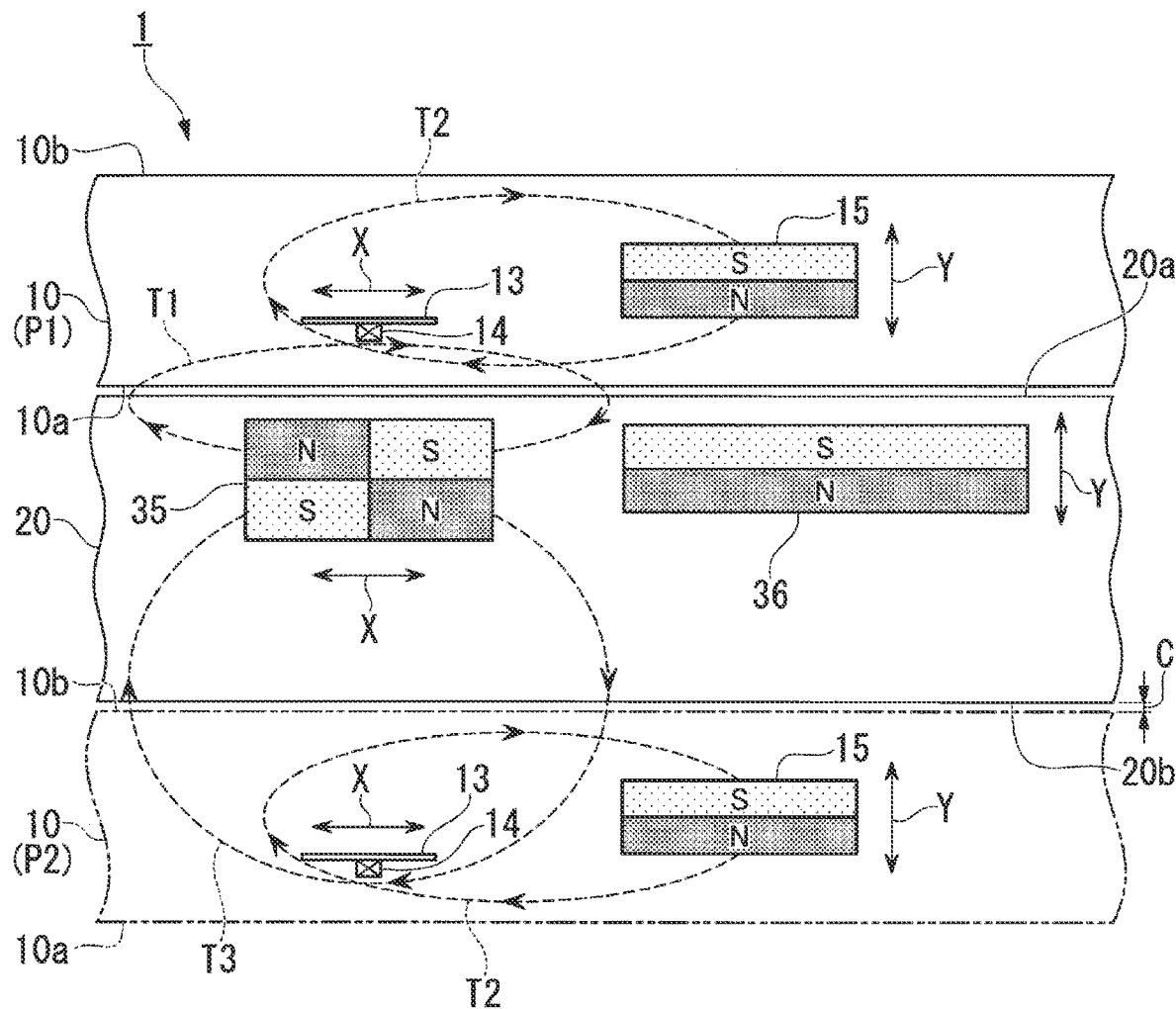
FIG. 3 is a schematic diagram illustrating the positional relationship between one embodiment of a magnetic sensor, a first magnet, and a second magnet included in the electronic apparatus of FIG. 1.

With reference to FIG. 3, a schematic view illustrating the positional relationship between the magnetic sensor 14, the first magnet 35, and the second magnet 15 according to one embodiment is shown. Here, FIG. 3 corresponds to a diagram viewed in the direction indicated by the arrow A in FIG. 2 (e.g., viewed from the front).

As illustrated in the embodiment of FIG. 3, the first magnet 35 is disposed inside the second unit 20 on the side of the first surface 20a. The first magnet 35 is, for example, a quadrupole magnet including pairs of N and S poles that are disposed, for example, one on the other so as to be right-left reversed from each other. The direction of the magnetic pole of the first magnet 35 is along the X-axis (e.g., the right-left direction).

In certain embodiments, the magnetic sensor 14 is disposed inside the first unit 10 on the side of the front surface 10a. The magnetic sensor 14 is, in some embodiments, a hall sensor among other types of sensors that are possible and contemplated herein. The direction of the magnetic flux detected by the magnetic sensor 14 is along the X-axis (e.g., the right-left direction).

The second magnet 15, in various embodiments, is disposed inside the first unit 10 so as to be adjacent to the magnetic sensor 14 without overlapping the first magnet 35 in either of the first state P1 and the second state P2. The second magnet 15 is, for example, a bi-polar magnet including N and S poles and includes a magnetic flux weaker and/or less than the magnetic flux of the first magnet 35. The direction of the magnetic pole of the second magnet 15 is along the Y-axis, orthogonal to the X-axis (e.g., the up-down direction, or a direction in which the first unit 10 is stacked on the second unit 20).

The magnetic flux T2 generated from the second magnet 15 offsets the magnetic flux T1 generated from the upper magnetic pole of the first magnet 35, which is disposed closer to the magnetic sensor 14 in the first state P1. Meanwhile, the magnetic flux T2 enhances the magnetic flux T3 generated from the lower magnetic pole of the first magnet 35, which is disposed closer to the magnetic sensor 14 in the second state P2.

Specifically, in the first state P1, although the magnetic sensor 14 is disposed closer to the first magnet 35, the detection sensitivity of the magnetic sensor 14 is lowered due to the effect of the second magnet 15 which can prevent or at least reduce that erroneous detection of turning ON of the magnetic sensor 14 before the first unit 10 is fully closed. Further, in the second state P2, the detection sensitivity of the magnetic sensor 14 can be enhanced and/or augmented with the assistance of the second magnet 15 even though the magnetic sensor 14 is disposed farther from the first magnet 35, which allows/enables the magnetic sensor 14 to detect the second state P2.

The second unit 20, in various embodiments, includes a third magnet 36 in addition to the first magnet 35 (see also, FIG. 1). The third magnet 36 is disposed inside the second unit 20 so as to be adjacent to the first magnet 35 without overlapping the magnetic sensor 14 in either of the first state P1 and the second state P2 and overlapping the second magnet 15.

The third magnet 36 is, for example, a bi-polar magnet including N and S poles and generates a magnetic flux that attracts the second magnet 15 in the first unit 10 toward the second unit 20 in the first state P1 and the second state P2. The direction of the magnetic pole of the third magnet 36 is along the Y-axis (e.g., in the up-down direction). With the above, because the first unit 10 and the second unit 20 are attracted to each other via the various magnets 15, 35, and/or 35, the first state P1 or the second state P2 can be readily maintained.

Note that, as described above, the electronic apparatus 1 includes a plurality of magnets, and that the magnetic flux of the second magnet 15, in particular, acts on the magnetic sensor 14 beforehand. Accordingly, to prevent or at least reduce the magnetic sensor 14 from responding to a subtle external magnetic force applied from the outside, (e.g., in the situation in which a user of the electronic apparatus 1 is wearing a magnetic bracelet or the like) the structure described below may be employed.

As illustrated in FIG. 1, the electronic apparatus 1 includes an angle sensor 37 that detects the rotation angle between the first unit 10 and the second unit 20 and a control device 33 that controls turning ON/OFF of the detection of magnetic flux by the magnetic sensor 14, based on a result of detection by the angle sensor 37. The angle sensor 37 includes an acceleration sensor 37A (e.g., an accelerometer, etc.) provided at any position on the first unit 10 and an acceleration sensor 37B (e.g., an accelerometer, etc.) provided at any position on the second unit 20.

The acceleration sensors 37A and 37B, in various embodiments, include triaxial acceleration sensors. Such an angle sensor 37 can detect the rotation angle between the first unit 10 and the second unit 20 and the posture(s) and/or position(s) of the first unit 10 and the second unit 20 based on the direction of acceleration of gravity output from the acceleration sensors 37A and 37B. Note that the angle sensor 37 may be a rotary encoder or the like sensor provided on the hinge mechanism 40 or the like mechanism.

The control device 33 include one or more electronic components (e.g., a CPU or the like device) mounted on the motherboard 30. The control device 33 is configured to control turning ON/OFF the detection of magnetic flux by the magnetic sensor 14 based on a result of detection by the angle sensor 37, as described elsewhere herein. Note that turning ON/OFF the detection of magnetic flux by the magnetic sensor 14 determines whether the magnetic sensor 14 is in an active state in which the magnetic sensor 14 can detect magnetic flux or in an inactive state in which the magnetic sensor 14 cannot detect magnetic flux.

Figure 4:
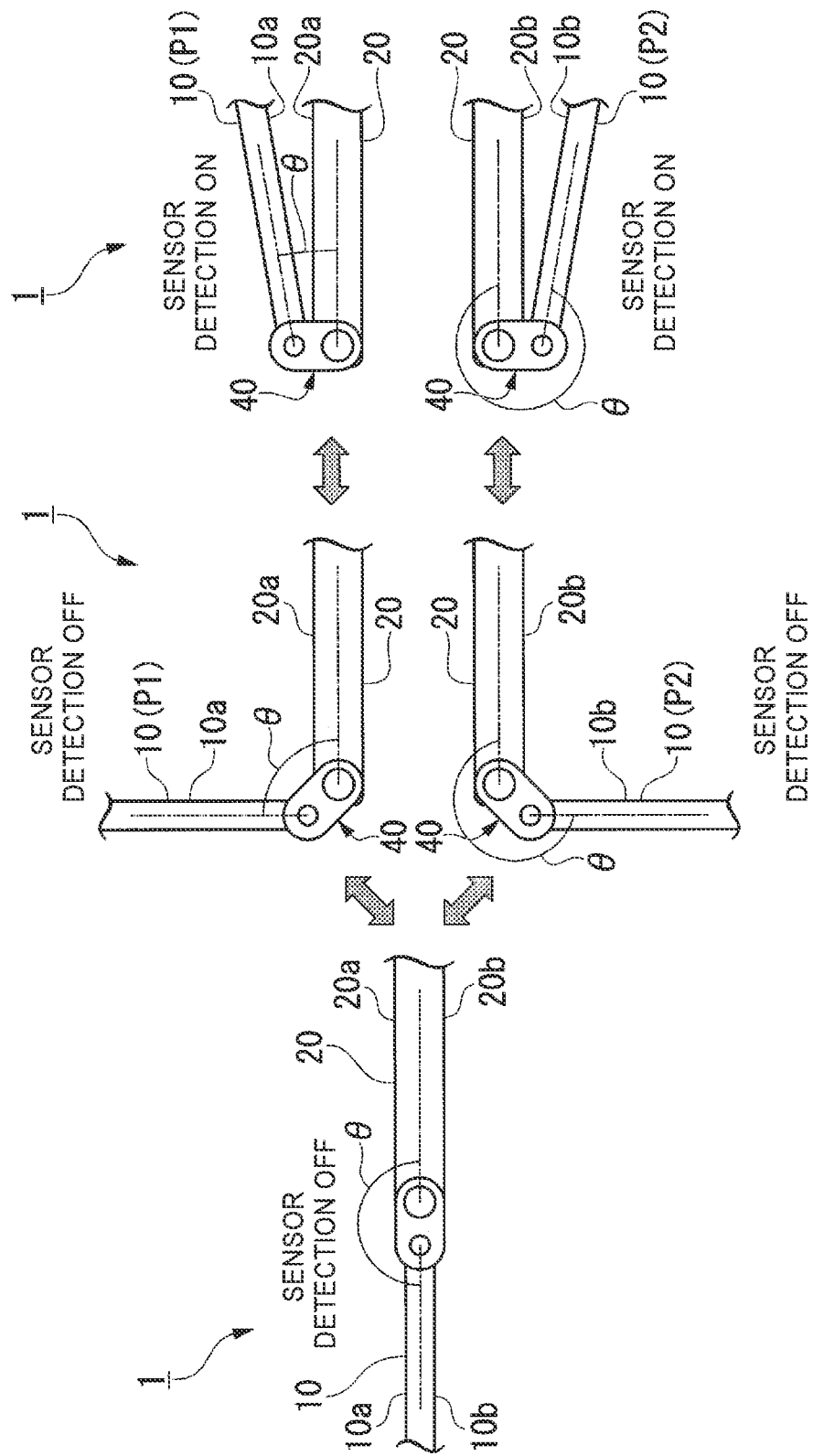
FIG. 4 is a schematic diagram illustrating one embodiment of ON/OFF control of detecting magnetic flux by a magnetic sensor included in the electronic apparatus of FIG. 1.
Figure 5:
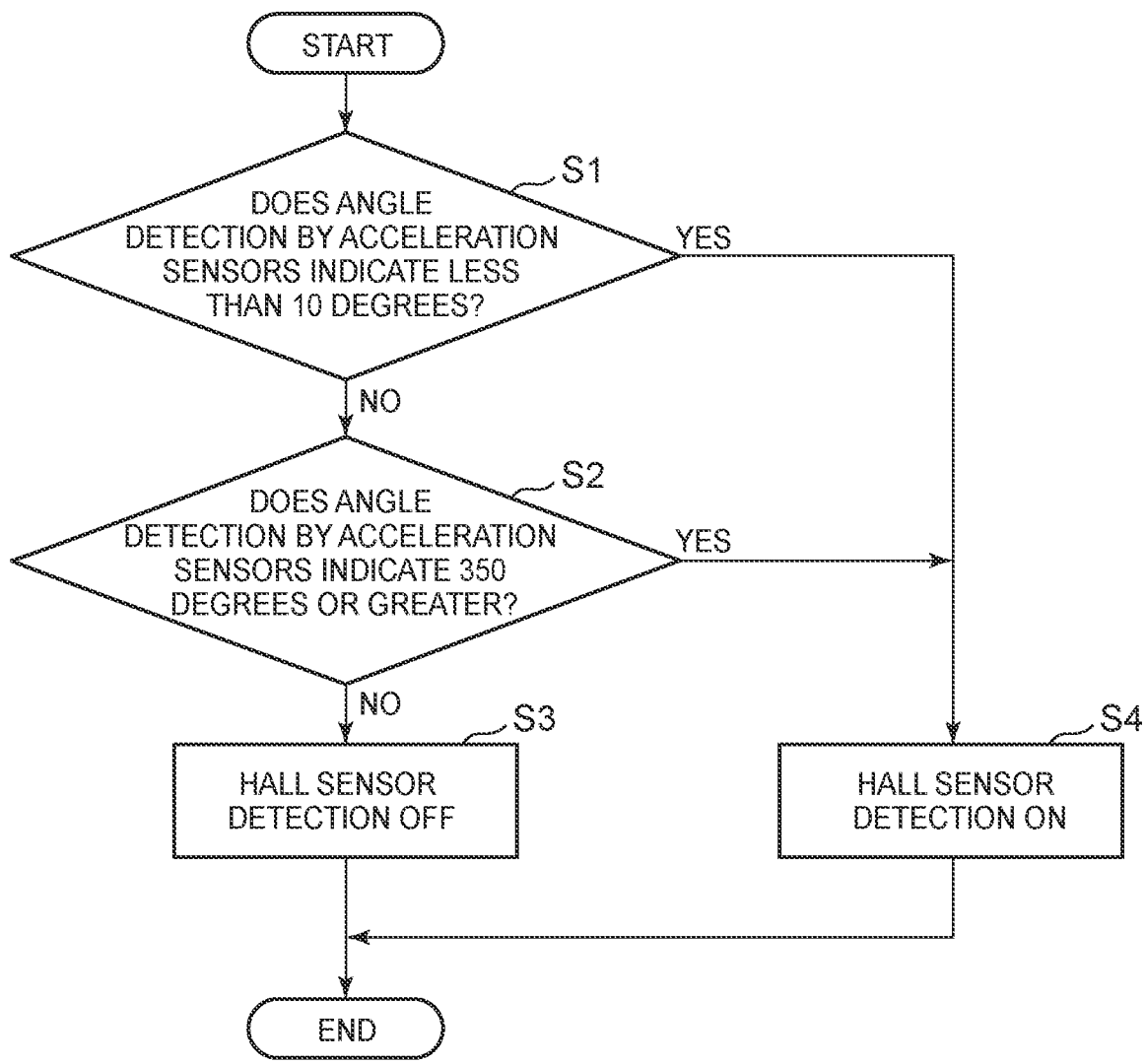
FIG. 5 is a flowchart illustrating one embodiment of a method for controlling a magnetic sensor included in the electronic apparatus of FIG. 1.

FIG. 4 is a diagram illustrating ON/OFF control of the detection of magnetic flux by the magnetic sensor 14 according to one embodiment. FIG. 5 is a flowchart of one embodiment of a method for ON/OFF control of the detection of magnetic flux by the magnetic sensor 14 performed by the control device 33.

In various embodiments, the control device 33 controls turning ON/OFF the detection of magnetic flux by the magnetic sensor 14 based on the rotation angle θ between the first unit 10 and the second unit 20, as approximately illustrated in FIG. 4. As shown, the rotation angle θ is zero degrees (0°) in the first state P1, in which the first unit 10 is parallel to the second unit 20, and 360° in the second state P2, in which the first unit 10 is parallel to the second unit 20.

Specifically, as illustrated in FIG. 5, the control device 33 initially determines whether the angle θ detected by the acceleration sensors 37A and 37B is less than about 10 degrees)(10° (block 51). In response to the angle θ detected by the acceleration sensors 37A and 37B being less than 10° (e.g., "Yes" at block 51), the control device 33 turns ON the detection of magnetic flux by the magnetic sensor 14 to thereby place the magnetic sensor 14 in an active state (block S4).

In contrast, in response to the angle θ detected by the acceleration sensors 37A and 37B not being less than about 10° and/or being greater than about 10° (e.g., "No" at block 51), the control device 33 determines whether the angle θ detected by the acceleration sensors 37A and 37B is greater than or equal to about three hundred fifty degrees)(350° (block S2). In response to angle θ detected by the acceleration sensors 37A and 37B being greater than or equal to about 350° (e.g., "Yes" at block S2), the control device 33 turns ON the detection of magnetic flux by the magnetic sensor 14 to thereby place the magnetic sensor 14 in an active state (block S4).

In contrast, in response to the angle θ detected by the acceleration sensors 37A and 37B not being greater than or equal to about 350° and/or less than about 350° (e.g., "No" at block S2), the control device 33 turns OFF the detection of magnetic flux by the magnetic sensor 14 to thereby place the magnetic sensor 14 in an inactive state (block S3). With the above, as illustrated in FIG. 4, detection of magnetic flux by the magnetic sensor 14 is turned OFF in response to the rotation angle θ between the first unit 10 and the second unit 20 being in the range of about 10° to about 350° so that erroneous detection of magnetic flux can be prevented or at least reduced.

Figure 6:
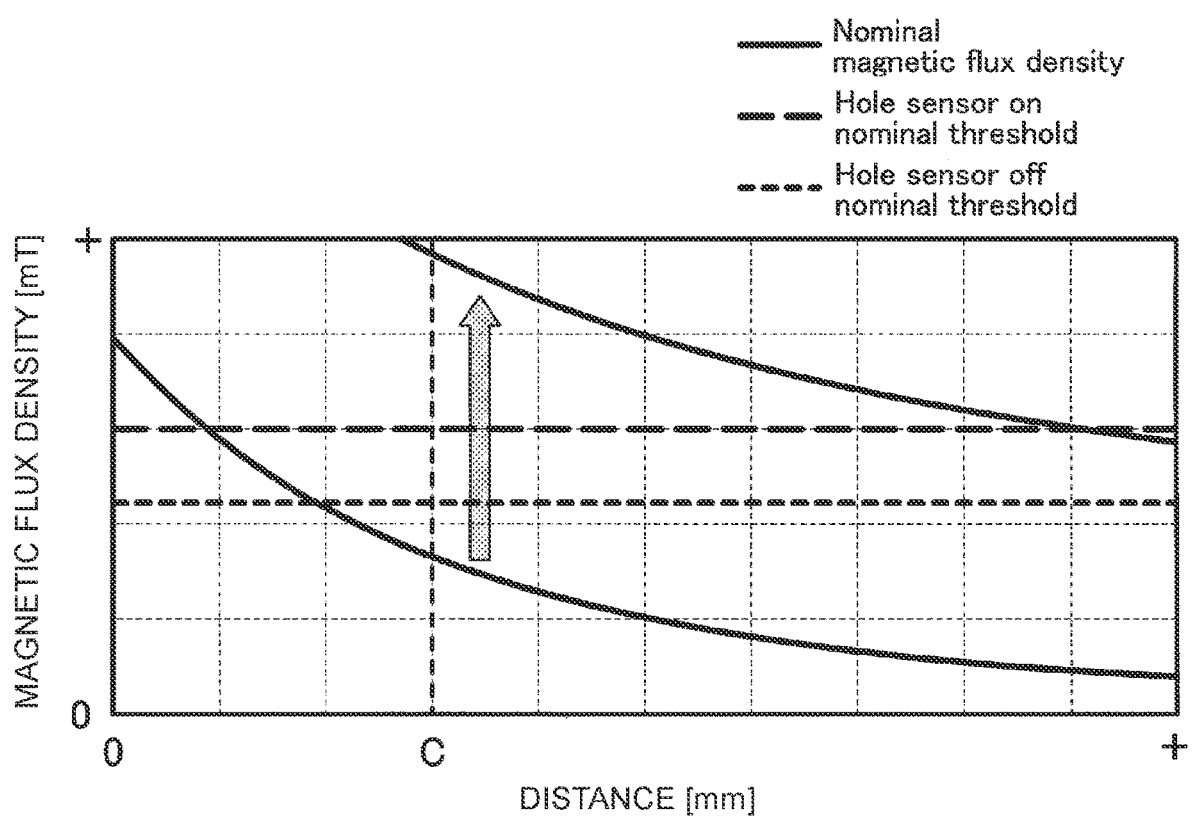
FIG. 6 is a graph showing a comparison in density [mT] of a magnetic flux detected by a magnetic sensor in a second state in accordance with one embodiment of the electronic apparatus of FIG. 1 between cases with and without a second magnet included in a chassis body of the electronic apparatus.

One example effect of the second magnet 15 will now be described with reference to FIG. 6. FIG. 6 is a graph showing a comparison in density [mT] of the magnetic flux received by the magnetic sensor 14 in the second state P2 in accordance with one embodiment between respective cases with and without the second magnet 15. Note that the ordinate in FIG. 6 indicates that the density [mT] of the magnetic flux received by the magnetic sensor 14 and the abscissa indicates the distance [mm] between the first unit 10 and the second unit 20 in the second state P2. The graph additionally shows a set and/or predetermined distance C, or a distance with respect to which it should be determined that the magnetic sensor 14 is at least in the second state P2 (see also, FIG. 3).

As illustrated in FIG. 6, a first threshold indicated by a longer pitch broken line and a second threshold indicated by a shorter pitch broken line lower than the first threshold are set to the magnetic sensor 14. As shown, the magnetic sensor 14 in the active state is turned ON at the first threshold and in the inactive state is turned OFF at the second threshold. Specifically, in the absence of the second magnet 15, the density of the magnetic flux received by the magnetic sensor 14 (e.g., indicated by the lower solid line) does not exceed the first threshold even at the set distance C, and thus, cannot be detected in the second state P2. In contrast, when the second magnet 15 is provided, as magnetic flux is acting on the magnetic sensor 14, the density of the magnetic flux received by the magnetic sensor 14 shifts to a higher density indicated by the upper solid line in FIG. 6. That is, because the density of the magnetic flux exceeds the first threshold at the set distance C, the magnetic flux can be detected in the second state P2.

As described above, because the electronic apparatus 1 includes the above described structure(s), the electronic apparatus 1 is able to determine and/or detect whether the first unit 10 and the second unit 20 are in a face-to-face state (e.g., the first state P1) or a back-to-back state (the second state P2). That is, the electronic apparatus 1 is able to determine and/or detect whether the first unit 10 and the second unit 20 are in the face-to-face state (e.g., the first state P1) or the back-to-back state (the second state P2) because the electronic apparatus 1 includes the first unit 10 including the display unit 11 on its front surface 10a, the second unit 20 including the first surface 20a, over which the first unit 10 is to be placed with the front surface 10a facing the first surface 20a, and the second surface 20b, over which the first unit 10 is to be placed with the rear surface 10b facing the second surface 20b, the second surface 20b being disposed on the opposite side from the first surface 20a, the first magnet 35 provided on the second unit 20, the magnetic sensor 14 provided on the first unit 10 to be disposed spaced apart from the first magnet 35 by the first distance D1 in the first state P1, in which the first unit 10 is placed over the first surface 20a of the second unit 20, and by the second distance D2, which is longer than the first distance D1, in the second state P2, in which the first unit 10 is placed over the second surface 20b of the second unit 20, and the second magnet 15 provided on the first unit 10 and configured to weaken or decrease the magnetic flux T1 to be received by the magnetic sensor 14 in the first state P1 and to enhance or increase the magnetic flux T3 to be received by the magnetic sensor 14 in the second state P2, it is possible to decrease the sensitivity of the magnetic sensor 14 by means of the magnetic flux T2 of the second magnet 15 in the first state P1 in which the magnetic sensor 14 is disposed closer to the first magnet 35, and to increase the sensitivity of the magnetic sensor 14 by means of the magnetic flux T2 of the second magnet 15 in the second state P2 in which the magnetic sensor 14 is disposed farther from the first magnet 35.

In addition, in the embodiment illustrated in FIG. 3, the direction of the magnetic pole of the second magnet 15 (e.g., the Y-axis) differs from the direction of the magnetic flux detected by the magnetic sensor 14 (e.g., the X-axis). Here, the structure shown in FIG. 3 can prevent excessive application of magnetic flux to the magnetic sensor 14 when the second magnet 15 is disposed close to the magnetic sensor 14, which can modify restriction in disposition.

Further, in certain embodiments, the third magnet 36 is provided on the second unit 20 to magnetically attract the second magnet 15 in the first state P1 and the second state P2. Here, this structure makes it possible to attract the first unit 10 and the second unit 20 to each other through the use of the second magnet 15, which assists detection of magnetic flux by the magnetic sensor 14, whereby the first state P1 or the second state P2 can be readily maintained.

Further, in some embodiments, because the electronic apparatus 1 includes the hinge mechanism 40 that connects the first unit 10 and the second unit 20, the first unit 10 and the second unit 20 are allowed and/or are able to rotate from the first state P1 to the second state P2 and the angle sensor 37 is able to detect the rotation angle θ between the first unit 10 and the second unit 20. In addition, the control device 33 is able to control turning ON/OFF the detection of magnetic flux by the magnetic sensor 14 based on the angle θ detected by the angle sensor 37, which prevents and/or at least reducing the magnetic sensor 14 from responding to a subtle external magnetic force applied from outside, as described elsewhere herein.

Although the various embodiments have been described above in detail with reference to the drawings, a specific structure is not limited to the above-described embodiments, and any design not departing from the spirit of the various embodiments is included. Further, the various structures described in the above embodiments can be combined.

For example, although a structure has been described in the above embodiments in which the first unit 10 is connected to the second unit 20 via the hinge mechanism 40, the first unit 10 may be separable from the second unit 20 in shifting from the above-described first state P1 to the second state P2. Further, for example, although a structure has been described in the above embodiments in which the direction of the magnetic pole of the second magnet 15 (e.g., the Y-axis) differs from the direction of the magnetic flux detection of the magnetic sensor 14 (e.g., the X-axis), the direction of the magnetic pole of the second magnet 15 may be the same as that of the magnetic flux detection of the magnetic sensor 14 if application of magnetic flux to the magnetic sensor 14 beforehand is possible. Nevertheless, if the direction of the magnetic pole of the second magnet 15 is along the Y-axis, magnetic attraction of the first unit 10 toward the second unit 20 is more easily attained because of the relationship relative to the third magnet 36.

Further, for example, although a laptop PC is mentioned as an example of an electronic apparatus 1 in the above-described embodiments, the present technology is not limited to a laptop PC, and the present technology is applicable to other types of electronic devices such as, for examples, tablets, cellular telephone, etc., and the like electronic apparatuses.

While the present technology has been described in each form, the technical scope of the present technology is not limited to the scope of the above-described aspects, and various combinations, changes, or improvements can be added without departing from the scope of the technology. The forms to which the combinations, changes, or improvements are added shall also be included in the technical scope of the present technology.

Embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

The invention claimed is:

1. An apparatus, comprising:
a lid body including a first magnet and a magnetic sensor; and
a chassis body including a second magnet,
wherein:
the magnetic sensor is configured to detect an amount of magnetic flux from the first magnet,
the second magnet is positioned on the chassis body to influence the amount of magnetic flux detected by the magnetic sensor based on relative positions of the lid body and the chassis body, and the magnetic sensor is coupleable to a control device configured to turn ON/OFF the magnetic sensor based on a rotation angle between the lid body and the chassis body.

2. The apparatus of claim 1, wherein the magnetic sensor is further configured to:
determine a current positional state of a plurality of states of the lid body relative to the chassis body based on the amount of magnetic flux from the first magnet detected by the magnetic sensor.

3. The apparatus of claim 2, wherein:
the plurality of positional states comprises a face-to-face state and a back-to-back state;
the magnetic sensor is configured to determine that the current positional state includes the face-to-face state in response to the detected amount of magnetic flux being greater than or equal to a threshold amount of magnetic flux; and
the magnetic sensor is configured to determine that the current positional state includes the back-to-back state in response to the detected amount of magnetic flux being less than the threshold amount of magnetic flux.

4. The apparatus of claim 3, wherein:
the chassis body further comprises a third magnet; and
the third magnet is positioned on the chassis body to magnetically attract the second magnet in the face-to-face state and the back-to-back state.

5. The apparatus of claim 2, further comprising:
a hinge mechanism configured to rotatably couple the lid body and the chassis body between the plurality of states;
an angle sensor configured to detect the rotation angle between the lid body and the chassis body; and
the control device.

6. The apparatus of claim 5, wherein the control device is configured to:
turn ON the magnetic sensor in response to the detected rotation angle being in the range of ten degrees to three hundred fifty degrees; and
turn OFF the magnetic sensor in response to the detected rotation angle being less ten degrees or greater than three hundred fifty degrees.

7. The apparatus of claim 1, wherein:
the first magnet and the magnetic sensor are spaced apart on the lid body at least a predetermined distance; and
a direction of a magnetic pole of the second magnet differs from a direction of the magnetic flux detected by the magnetic sensor.

8. An apparatus, comprising:
a sensor; and
a processor coupled to the sensor,
wherein:
the sensor is configured to detect an amount of magnetic flux from a first magnet positioned at least a predetermined distance from the apparatus,
the amount of magnetic flux detected by the sensor is influenced by a position of a second magnet relative to the first magnet, and
the apparatus is coupleable to a control device configured to turn ON/OFF the magnetic sensor based on a rotation angle between the lid body and the chassis body.

9. The apparatus of claim 8, wherein:
the magnetic sensor is turned ON in response to the detected rotation angle being in the range of ten degrees to three hundred fifty degrees; and
the magnetic sensor is turned OFF in response to the detected rotation angle being less ten degrees or greater than three hundred fifty degrees.

10. The apparatus of claim 8, wherein:
a direction of a magnetic pole of the second magnet differs from a direction of the magnetic flux detected by the sensor.

11. The apparatus of claim 8, wherein:
the processor is configured to determine a current positional state of a plurality of positional states of a lid body relative to a chassis body based on the amount of magnetic flux detected by the sensor.

12. The apparatus of claim 11, wherein:
the plurality of positional states comprises a face-to-face state and a back-to-back state.

13. The apparatus of claim 12, wherein the processor is further configured to:
determine that the current positional state includes the face-to-face state in response to the detected amount of magnetic flux being greater than or equal to a threshold amount of magnetic flux; and
determine that the current positional state includes the back-to-back state in response to the detected amount of magnetic flux being less than the threshold amount of magnetic flux.

14. A method, comprising:
detecting, by a magnetic sensor, an amount of magnetic flux from a first magnet positioned at least a predetermined distance from the magnetic sensor, wherein the amount of magnetic flux detected by the magnetic sensor is influenced by a position of a second magnet relative to the first magnet; and
turning ON/OFF the magnetic sensor based on a rotation angle between the lid body and the chassis body.

15. The method of claim 14, further comprising:
determining, by the magnetic sensor, a current positional state of a plurality of positional states of a lid body relative to a chassis body based on the amount of magnetic flux detected by the magnetic sensor.

16. The method of claim 15, wherein:
the plurality of positional states comprises a face-to-face state and a back-to-back state.

17. The method of claim 16, further comprising:
determining that the current positional state includes the face-to-face state in response to the detected amount of magnetic flux being greater than or equal to a threshold amount of magnetic flux.

18. The method of claim 17, further comprising:
determining that the current positional state includes the back-to-back state in response to the detected amount of magnetic flux being less than the threshold amount of magnetic flux.

19. The method of claim 16, further comprising:
determining that the current positional state includes the back-to-back state in response to the detected amount of magnetic flux being less than the threshold amount of magnetic flux.

20. The method of claim 15, wherein turning ON/OFF the magnetic sensor based on the rotation angle between the lid body and the chassis body comprises:
turning ON the magnetic sensor in response to the detected rotation angle being in the range of ten degrees to three hundred fifty degrees; and
turning OFF the magnetic sensor in response to the detected rotation angle being less ten degrees or greater than three hundred fifty degrees.

* * * * *